March 17, 1953   E. J. DILLMAN ET AL   2,631,598
AUTOMATICALLY OPERATED VALVE
Filed July 27, 1948   2 SHEETS—SHEET 1

INVENTORS
Earnest J. Dillman
Jess C. Bailey
BY
Andrew K. Fulda
their ATTORNEY

March 17, 1953   E. J. DILLMAN ET AL   2,631,598
AUTOMATICALLY OPERATED VALVE
Filed July 27, 1948   2 SHEETS—SHEET 2

INVENTORS
Earnest J. Dillman
Fred C. Galley
BY
Andrew K. Foulds
their ATTORNEY

Patented Mar. 17, 1953

2,631,598

UNITED STATES PATENT OFFICE 2,631,598

AUTOMATICALLY OPERATED VALVE

Earnest J. Dillman and Fred C. Galley, Detroit, Mich., assignors to Detroit Controls Corporation, Detroit, Mich., a corporation of Michigan Application July 27, 1948, Serial No. 40,938

15 Claims. (Cl. 137—80)

This invention relates to new and useful improvements in automatic fluid controlling valve assemblies in general and more particularly to certain novel control means therefor.

One of the objects of this invention is to provide a new and improved automatic fluid controlling valve assembly.

Another object is to provide an automatic valve assembly having novel manual opening and automatic reset features.

Another object is to provide a limit control means for an automatic valve assembly.

Other objects will become apparent from time to time throughout the specification and claims as hereinafter related.

This invention comprises a new and improved construction and combination of parts and their cooperative relation to each other which will be described more fully hereinafter and the novelty of which will be particularly pointed out and distinctly claimed.

In the accompanying drawings to be taken as part of the specification there is clearly and fully illustrated a preferred embodiment of this invention in which drawings:

Figure 1 is a view in longitudinal cross-section on the section line 1—1 of Fig. 2 and showing an automatic valve assembly embodying this invention.

Figure 2:
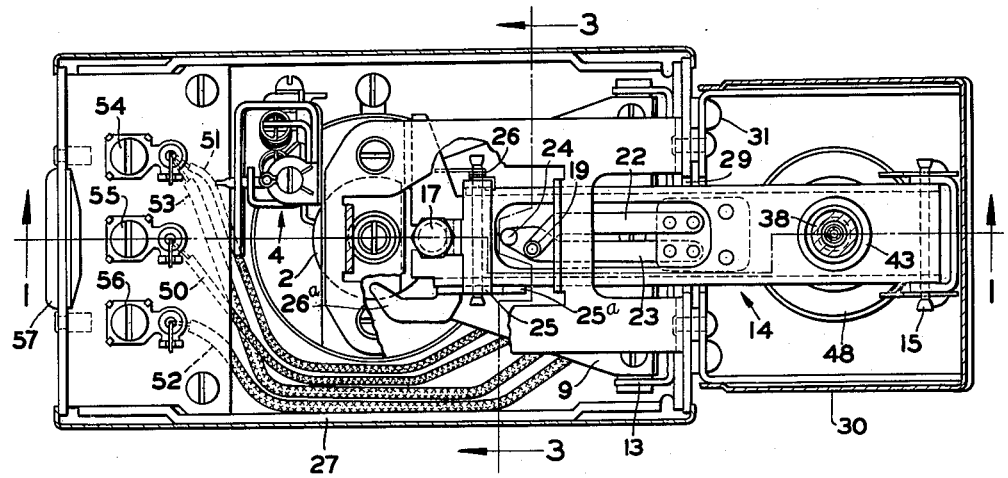
Fig. 2 is a plan view taken in section on the line 2—2 of Fig. 1.
Figure 3:
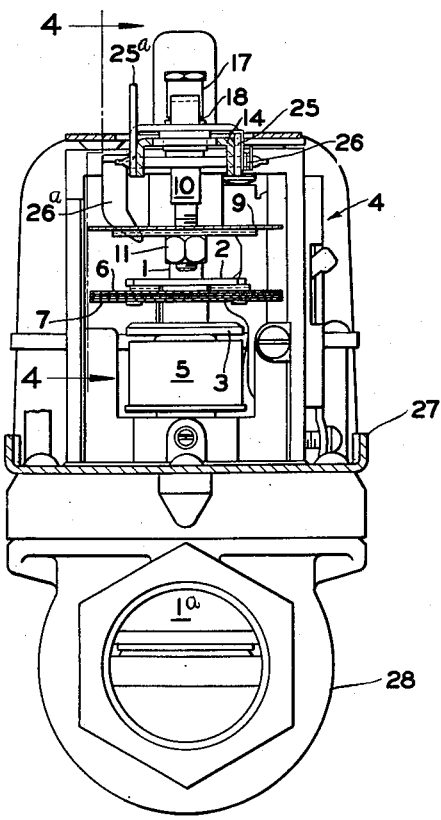
Fig. 3 is an end sectional view taken on the line 3—3 of Fig. 2.

Referring to the drawings by characters of reference, there is shown in Fig. 1 a gas valve assembly which has been adapted substantially from the valve assembly shown in Patent 2,409,112 to Dillman. The basic valve structure and operating mechanism for this valve are substantially the same as that shown in the aforementioned patent and drawings.

In Fig. 1 there is shown a valve 1a having a valve operating member or valve stem 1 which has a collar 2 thereon and a magnetic armature 3. There is a spring mechanism 4 which cooperates with the valve stem 1 through a roller type finger member 4a which extends between the collar 2 and armature 3 and urges the valve stem toward a valve closed position. The magnetic armature 3 cooperates with a magnet 5 so that a greater amount of force is required for initial opening movement of the valve stem than is required for movement immediately subsequent thereto thereby obtaining a quick or snap initial opening movement. As in the aforementioned Dillman patent there is provided a thermostatic member in the form of a bimetallic plate or arm 6 which is operable to be energized by an electric heater 7 for operation of the valve. There is a spacing member 8 secured to the bimetallic plate 6 and to which is secured a flexible bimetallic plate or arm 9 extending substantially parallel to the bimetallic plate 6. There is a movable member 10 having an abutting portion or nut 11 secured on the end thereof which is engageable with the end portion 12 of the arm 9 and is operable to hold the arm 9 in a predetermined initial position. The spacing member 8 is pivoted between the arms of a bracket member 13. The arm 9 in cooperative engagement with the nut 11 on the movable member 10 is operable to restrain the bimetallic plate 6 from pivotal movement in a counterclockwise direction. Cooperable with the member 10 there is a lever member 14 which is pivoted at the pivot point 15 in the valve assembly and which carries a supporting portion 16 which functions as a support for the movable member 10. The movable member 10 has a portion 17 of a larger diameter providing an annular shoulder 18 which limits downward movement of the member 10 through the supporting portion 16 of the lever 14. The movable member 10 is operable upon upward movement to move the arm 9 to pivot the bimetallic plate 6 in a valve opening direction, and is operable upon downward movement to permit the same to pivot in a valve closing direction.

Figure 4:
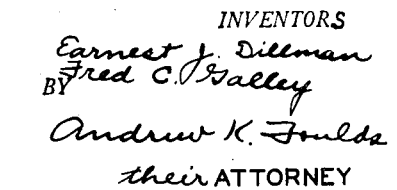
Fig. 4 is a detail view of the automatic reset mechanism of this valve assembly and is viewed from the section line 4—4 of Fig. 3, and, Fig. 5 is a diagrammatic view of an electric circuit for this valve assembly when connected for operation.

There are a pair of switch contacts 19 and 20 of a normally open switch 21 which are carried by flexible arms 22 and 23 secured on the lever 14. The switch contact arm 23 carries and has projecting downward therefrom an abutment member 24 of an insulating material which engages the arm 9 so that upon upward movement of the arm 9 by the movable member 10 the switch contacts 19 and 20 will be closed. There is provided a latching member 25 which is pivoted on the end portion of the lever 14 and is engageable with the movable member 10. The pivoted latching member 25 is urged by a spring 26 (see Fig. 2) toward engagement with the movable member 10. The pivoted latching member 25 has a projecting portion 26a (see Fig. 4) extending downward therefrom and toward the collar 2 on the valve stem 1, the projecting portion 26ª being engageable with the valve stem collar 2 upon predetermined upward movement thereof. When the movable member 10 is lifted to pivot the bimetallic plate 6 in a valve opening direction, the latching member 25 is permitted to engage the movable member 10 below the annular shoulder 18 thereby restraining the member 10 against downward movement and holding the valve stem 1 in an open position. As the valve stem 1 is moved further in an opening direction, the valve stem collar 2 will engage the latching member projecting portion 26ª and pivot the latching member 25 out of engagement with the annular shoulder 18 thus permitting the movable member 10 to move downward to its initial position (as shown in Fig. 1) in the supporting member 16. There is provided a projection or finger 25ª extending upward from the latch member 25 by which the movable member 10 may be manually released. The valve operating mechanism so far described is enclosed in a casing 27 which is secured on a valve casing 28 into which projects the valve operating stem 1. The movable member 10 is enclosed on top by a removable cover member 27ª on the casing 27. The lever 14 which is pivoted at the pivot point 15 projects through an aperture 29 interconnecting the operating casing 27 and an auxiliary control casing 30, the pivot point 15 for the lever 14 being located in the auxiliary casing 30. The auxiliary casing 30 is secured to the main operating casing 27 at one end portion thereof by a plurality of screws or bolts 31. There is a casing portion 32 which is secured on the top of the casing 30 and which has sealed therein a bellows member 33 which provides an expansible and contractible chamber 34. There is an inlet member or fitting 35 secured in an aperture on the end portion 36 of the casing 32 and through which is admitted fluid under pressure for pressure or temperature response by the bellows 33. If a pressure response is desired the fitting 35 would be connected to a pressure line; and if a temperature response is desired the fitting 35 would be connected by a small tube or capillary to a thermostatic bulb element filled with a volatile fluid.

The bellows 33 has a movable end wall 37 which is cup-shaped and which has secured through an aperture therein a thrust member 38 which extends both upward and downward therefrom. The portion 39 of the thrust member 38 which extends upward from the bellows end wall 37 has secured therein a screw member 40 having a head which is engageable with an annular shoulder 41 within the inlet passageway 42 in the inlet member 35, the screw head 40 providing a limit for downward movement of the thrust member 38.

There is a conically cup-shaped thrust receiving member 43 carried by the lever 14 and which receives the conical tip portion 44 of the thrust member 38. The conical tip portion 45 of the member 43 is positioned against a conical cup-shaped member 46 which is carried by one end portion of a helical spring 47. The other end of the spring 47 is carried by a spring supporting member 48 which is adjustably positioned on a screw-threaded projection or post 49 extending vertically from the bottom wall of the casing 30. Upon excessive pressure or temperature to which the bellows 33 responds, the bellows end wall 37 is operable to be moved downward and with it the thrust member 38. Downward movement of the thrust member 38 will operate to rotate the lever 14 against the force of the spring 47 in a counter-clockwise direction thus moving the movable member 10 downward and permitting the bimetallic plate 6 to move in a valve closing direction independently of the temperature state of the bimetallic plate 6. The member 48 is operable upon adjustment to determine the spring force against which the bellows 33 must operate and so is operable to determine the temperature or pressure of response of the bellows.

The flattened portions forming the bottoms of the cup-shaped thrust receiving members 44 and 46 function to permit a slight lateral movement due to rotation of the lever 14 so that the thrust member 38 and spring 47 may be kept in an oppositely aligned position.

There are two pairs of lead wires 50, 51 and 52, 53 leading from the electric heater 7 and the switch 21 respectively. There is provided a plurality of electric terminals 54, 55 and 56 to which are connected the lead wires from the heater and from the switch. There is provided in the end wall of the casing 27 adjacent the electric terminals a rubber outlet collar member 57 for the admission of a plurality of electric wires for connection to the terminals for operation of the valve assembly.

In Fig. 5 the electric heater 7 and the switch 21 are shown diagrammatically connected to the terminals 54, 55 and 56 and these terminals in turn connected to a transformer 58 and a room thermostat 59 for operation of the valve assembly. The lead wires interconnecting the switch and heater and terminals are connected as follows: Lead wire 52 connected to the movable switch contact arm 23 or contact 20 is connected to terminal 56, and lead wire 53 connected to the fixed contact arm 22 or contact 19 is connected to terminal 54. The lead wires 50 and 51 respectively are connected to terminals 55 and 54 to provide a circuit for the heater 7. The transformer 58 is connected from its primary to the power source 60 and is connected from its secondary by leads 61 and 62 respectively to electric terminals 55 and 56 of the valve assembly. The room thermostat 59 (shown diagrammatically) is a conventional thermostatic switch having a fixed contact 63, a movable contact 64 carried by a thermo-responsive element such as a bimetal strip 65 and having a compensating heater 66 connected adjacent the bimetal strip 65. The fixed thermostatic contact 63 is connected by a lead 67 to terminal 56 and the movable contact 64 is connected by a lead 68 extending from the base of the bimetallic strip 65 to the terminal 54. The compensating heater 66 is connected at one end to the bimetallic strip 65 at the lead 68 and at its other end is connected by a lead 69 running to the terminal 55.

In operation this invention functions as follows: This valve is particularly adapted for controlling the flow of gas to a gas burner. The operation of this valve mechanism by the bimetal actuator 6 is substantially identical to that described in the Dillman Patent 2,409,112. When the room thermostat contacts 63 and 64 are closed, calling for heat, a circuit is established from the transformer secondary through lead wire 62, terminal 56, lead 67 contacts 63 and 64, bimetallic strip 65, lead 68, terminal 54, lead 51, electric heater 7, lead 50, terminal 55 and lead 61 terminating back at the transformer secondary. A branch circuit is also established through the compensating heater 66, lead 69, terminal 55 and lead 61 back to the transformer, the compensating heater functioning to anticipate temperature rise so as to prevent "hunting" by this valve. This compensating heater, as used in room thermostats, is well understood in the art and does not require further description. The circuit just described extends through the electric heater 7 and is operable to energize the bimetallic plate 6 which warps upward and by engagement with the collar 2 lifts the valve stem 1 to open the gas valve for supply of fuel to the gas burner (not shown). When the bimetallic arm 6 is warped upward to lift the valve stem 1 there is created a pivotal reactive force which is taken up by a slight flexing of the arm 9 which engages the nut 11 on the movable member 10 to prevent rotation of the bimetallic arm 6 about its pivot 13.

There is provided a simple pressure or temperature limit control for the operation of the gas valve assembly in which the responsive bellows 33 which acts on the lever 14 is operable to move the lever 14 in response to predetermined change in a condition. If the valve is used with a hot air or hot water heating system the bellows 33 would be designed to respond to changes in pressure in the expansible and contractable chamber 34 transmitted from a thermostatic bulb element containing a volatile fluid which element would be responsive to the temperature of the heated air or the water and which is operable to function as a limit control for the operation of the valve assembly. If the valve assembly were used in a steam heating system the fitting 35 could be connected directly to a steam line for direct pressure response by the bellows 33. Upon excessive pressure or temperature rise the bellows element 33 will collapse thus moving the thrust member 38 to rotate the lever 14 in a downward direction as previously described. This downward movement of the lever 14 will move the movable member 10 downward thus permitting the arm 9 and bimetallic arm 6 to pivot to permit the valve stem 1 to move to a closed position.

If there is a failure of electric power it is desirable in electrically operated valves to have a means of manual adjustment for the valve to permit operation during such periods of power failure. In this invention the manual adjustment is accomplished by the movable member 10. In the event of power failure the movable member 10 is moved upward manually until the latch member 25 snaps under the annular shoulder 18 which prevents downward movement of the member 10 until the latch member 25 is disengaged. Upward movement of the movable member 10 will lift the movable arm 9 and pivot the bimetallic arm 6 to lift the valve stem 1 independently of the temperature state of the bimetallic arm 6. As was previously described, the upward movement of the movable arm 9 by the movable member 10 will cause the arm 9 to engage the abutment 24 and move the switch contact arm 23 to close the switch contact 20 against the fixed contact 19. The closure of these switch contacts is operable to close a second circuit for energization of the electric heater 7 independently of the room thermostat 59 for operation upon restoration of electric power. When the power is restored there is established an electric circuit from the secondary of the transformer 58 through lead 62, terminal 56, lead 52, switch contacts 20, 19, lead 53, terminal 54, lead 51, heater 7, lead 50, terminal 55 and lead 61 terminating the circuit back at the transformer secondary. This circuit is established for the electric heater 7 independently of the room thermostat 59 so that by the restoration of electric power the electric heater 7 will be energized to cause the bimetallic arm 6 to move the valve stem 1 further in an opening direction. This further opening movement of the valve stem 1 will cause the collar 2 to engage the projecting portion 26ª of the pivoted latch member 25 and upon sufficient further opening movement will cause the member 25 to be pivoted out of engagement with the annular shoulder 18 of the movable member 10 permitting the movable member 10 to move downward to its original position. If, however, while the valve stem 1 is opened by the manually movable member 10 the temperature output of the heating means to which this valve assembly is connected should become excessive the temperature limiting control previously described will operate to rotate the lever 14 to move the member 10 downward (along with the lever end portion 16) thus permitting the bimetallic arm 6 to pivot to allow the valve stem 1 to move to closed position.

From the foregoing it is seen that there has been provided a new and improved gas valve assembly having a manually operable means for valve opening in the event of power failure with a means for automatically closing or resetting the valve upon restoration of power and a novel temperature limiting means for controlling operation of the valve to provide safe operation, either during normal operation or during operation by the manually operable means.

While there has been shown and described only one form of this invention, it should be obvious to those skilled in the art that many variations of this basic invention could be made without department from the scope and intent of the invention.

Having thus described the invention what is claimed and is desired to be secured by Letters Patent of the United States is:

1. In an automatic valve assembly, a valve operating member, a first means fulcrumed for pivotal movement and operable to move said operating member, movable means supporting said first means in an initial position, said movable means being operable upon movement in one direction to pivot said first means in one direction, means operable upon predetermined movement of said movable means in said one direction to restrain the same from movement in the opposite direction, and said operating member being cooperable with said last-named means and operable upon predetermined movement by said first means in said one direction to release said movable means to permit pivotal movement of said first means in the opposite direction.

2. In an automatic valve assembly, a valve operating member, a first means fulcrumed for pivotal movement and operable to move said operating member, a movable member supporting said first means in an intial position, said movable member being operable upon movement in one direction to pivot said first means in one direction, latching means operable upon predetermined movement of said movable member in said one direction to restrain the same from movement in the opposite direction, and said operating member being cooperable with said latching means and operable upon predetermined movement by said first means in said one direction to release said movable member to permit pivotal movement of said first means in the opposite direction.

3. In an automatic valve assembly, a valve operating stem, an operating member operable to move said stem, a fulcrum on which said operating member is pivoted, an arm operatively connected to said operating member and operable to control pivotal movement thereof, a movable abutment member cooperable with said arm and operable to restrain the same from pivotal movement in one direction, said abutment member being operable upon movement to pivotally move said arm and said operating member in the opposite direction, means engageable with said abutment member and operable upon predetermined movement of the same in said opposite direction to restrain the same from movement in said one direction, and said valve operating stem being cooperable with said engaging means upon predetermined movement by said operating member in said opposite direction and operable to release said abutment member to permit pivotal movement of said operating member in said one direction.

4. In an automatic valve assembly, a valve operating stem, an operating member operable to move said stem, a fulcrum on which said operating member is pivoted, an arm operatively connected to said operating member and operable to control pivotal movement thereof, a movable abutment member cooperable with said arm and operable to restrain the same from pivotal movement in one direction, said abutment member being operable upon movement to pivotally move said arm and said operating member in the opposite direction, a pivoted latch member engageable with said abutment member and operable upon predetermined movement of the same in said opposite direction to restrain the same from movement in said one direction, and said valve operating stem being cooperable with said latch member upon predetermined movement by said operating member in said opposite direction and operable to move the same out of engagement with said abutment member to release said abutment member to permit pivotal movement of said operating member in said one direction.

5. In an automatic valve assembly, a valve operating stem, an operating member operable to move said stem and fulcrumed for pivotal movement, an arm, means securing said arm to said operating member in a spaced relation thereto, a movable member having an abutting portion engageable with said arm and operable to restrain said arm and said operating member from pivotal movement in one direction, said movable member being operable upon movement in the opposite direction to pivot said arm and said operating member about their fulcrum, a pivoted latch member engageable with said movable member and operable upon predetermined movement of the same in said opposite direction to restrain the same from movement in said one direction, said latch member having a projecting portion extending toward said valve operating stem, and said valve operating stem being engageable with said projecting portion and operable upon predetermined movement in said opposite direction to pivot said latch member out of engagement with said movable member to release the same for movement in said one direction.

6. In an automatic valve assembly, a valve operating member, electrically energizable means engageable with said member and operable upon energization to move the same toward valve open position, said electrically energizable means being fulcrumed for pivotal movement and operable upon pivoting in one direction to move said member toward valve open position, movable means supporting said electrically energizable means in an initial position and operable upon movement in said one direction to pivot said electrically energizable means in said one direction, means operable upon predetermined movement of said movable means in said one direction to restrain the same from movement in the opposite direction, said electrically energizable means being operable upon energization to move said member further in an opening direction, and said member being cooperable with said restraining means upon predetermined further opening movement by said electrically energizable means and operable to release said movable means for movement in the opposite direction.

7. In an automatic valve assembly, a valve operating stem, an electrically energizable operating member operable upon energization to move said stem, a fulcrum on which said operating member is pivoted, said member being operable upon pivotal movement to move said stem, an arm operatively connected to said operating member and operable to control pivotal movement thereof, a movable abutment member cooperable with said arm and operable to restrain the same from pivotal movement in one direction, said abutment member being operable upon movement to pivotally move said arm and said operating member in the opposite direction to move said stem in said opposite direction, a pivoted latch member engageable with said abutment member and operable upon predetermined movement of the same in said opposite direction to restrain the same from movement in said one direction, said operating member being operable upon energization subsequent to said predetermined movement by said abutment member to move said stem further in said opposite direction, and said valve operating stem being cooperable with said latch member upon predetermined further movement by said operating member in said opposite direction and operable to move the same out of engagement with said abutment member to release said abutment member to permit pivotal movement of said operating member in said one direction.

8. In an automatic valve assembly, a valve operating stem, a collar on said stem, a bimetallic operating member engageable with said collar and operable upon energization to lift said valve operating stem, an arm secured by a spacing member to said bimetallic member, said spacing member being fulcrumed for pivotal movement of said arm and said bimetallic member, a movable member having an abutting portion engageable with said arm, said movable member being operable to be moved upward thereby lifting said arm and pivoting said bimetallic member to lift said valve stem, a pivoted latch member engageable with said movable member upon predetermined upward movement thereof to restrain the same from downward movement, said latch member having a projecting portion extending toward said valve operating stem, and said bimetallic member being operable upon energization to lift said valve operating stem further, said collar being engageable with said projecting portion upon said further movement and operable to pivot said latch member out of engagement with said movable member to release the same for downward movement.

9. In an automatic valve assembly, a valve operating member, thermostatic means fulcrumed for pivotal movement and operable upon energization to move said operating member, electric means for energizing said thermostatic means, said electric means being adapted to be energized by an electric circuit extending external of said assembly and including a control switch, movable means supporting said thermostatic means in an initial position, said movable means being operable to be moved to pivot said thermostatic means to move said operating member in a valve opening direction independently of said electric means in the event of failure of current in said electric circuit, means cooperable with said movable means and operable upon predetermined movement thereof in said one direction to provide a second circuit for energizing said electric means independently of said external control switch, means operable upon predetermined movement of said movable means in said one direction to restrain the same from movement in the opposite direction, said second circuit being operable to energize said electric means upon recurrence of current after a current failure and operation of said movable means, said electric means upon energization by said second circuit causing said thermostatic means to move said operating member further in said one direction, and said operating member being cooperable with said last-named restraining means and operable upon predetermined further movement by said thermostatic means in said one direction to release said movable means to permit pivotal movement of said thermostatic means in the opposite direction.

10. In an automatic valve assembly, a valve operating member, thermostatic means fulcrumed for pivotal movement and operable upon energization to move said operating member, electric means for energizing said thermostatic means, said electric means being adapted to be energized by an electric circuit extending external of said assembly and including a control switch, movable means supporting said thermostatic means in an initial position, said movable means being operable to be moved to pivot said thermostatic means to move said operating member in a valve opening direction independently of said electric means in the event of failure of current in said electric circuit, electric switch means cooperable with said movable means and operable upon predetermined movement thereof in said one direction to close a second circuit for energizing said electric means independently of said external control switch, means operable upon predetermined movement of said movable means in said one direction to restrain the same from movement in the opposite direction, said second circuit being operable to energize said electric means upon recurrence of current after a current failure and operation of said movable means, said electric means upon energization by said second circuit causing said thermostatic means to move said operating member further in said one direction, and said operating member being cooperable with said last-named restraining means and operable upon predetermined further movement by said thermostatic means in said one direction to release said movable means and said thermostatic means for movement in the opposite direction, said last-named movement of said movable means being operable to pen said electric switch means.

11. In an automatic valve assembly, a valve operating member, thermostatic means fulcrumed for pivotal movement and operable upon energization to move said operating member, electric means for energizing said thermostatic means, said electric means being adapted to be energized by an electric circuit extending external of said assembly and including a control switch, a movable member supporting said thermostatic means in an initial position, said movable member being operable to be moved to pivot said thermostatic means to move said operating member in a valve opening direction independently of said electric means in the event of failure of current in said electric circuit, electric switch means cooperable with said movable member and operable upon predetermined movement thereof in said one direction to close a second circuit for energizing said electric means independently of said external control switch, latching means operable upon predetermined movement of said movable member in said one direction to restrain the same from movement in the opposite direction, said second circuit being operable to energize said electric means upon recurrence of current after a current failure and operation of said movable member, said electric means upon energization by said second circuit causing said thermostatic means to move said operating member further in said one direction, and said operating member being cooperable with said latching means and operable upon predetermined further movement by said thermostatic means in said one direction to release said movable member and said thermostatic means for movement in the opposite direction, said last-named movement of said movable member being operable to open said electric switch means.

12. In an automatic valve assembly, a valve operating stem, a thermostatic member operable upon energization to move said stem and fulcrumed for pivotal movement, an electric heater for energizing said thermostatic member, said heater being adapted to be energized by an electric circuit extending external of said assembly and including a control switch, an arm secured to and spaced from said thermostatic member, a movable member having an abutting portion engageable with said arm and operable to restrain said arm and said thermostatic member from pivotal movement in one direction, said movable member being operable to be moved in the opposite direction to pivot said arm to lift said valve operating stem independently of said electric heater in the event of failure of current in said electric circuit, a switch having a pair of normally open contacts and having an abutment extending from one of them, said abutment being cooperable with said arm upon predetermined movement of the same by said movable member and operable to close said switch, a second circuit for said electric heater including said last-named switch and operable to energize said electric heater independently of said control switch, a pivoted latch member engageable with said movable member and operable upon predetermined movement of the same in said opposite direction to prevent movement in said one direction, said second circuit being operable to energize said electric heater upon recurrence of current after a current failure and operation of said movable member, said electric heater upon energization by said second circuit causing said thermostatic member to move said valve operating stem further in said opposite direction, and said valve operating stem being cooperable with said latch member and operable upon predetermined further movement by said thermostatic member in said opposite direction to pivot said latch member out of engagement with said movable member to release the same for movement in said one direction, said last-named movement of said movable member being operable to permit said second circuit switch to open.

13. In an automatic valve assembly, a valve operating stem, a collar on said stem, a bimetallic operating member engageable with said collar and operable upon energization to lift said valve operating stem, an electric heater for energizing said bimetallic member, said heater being adapted to be energized by an electric circuit extending external of said assembly and including a control switch, an arm secured by a spacing member to said bimetallic member, said spacing member being fulcrumed for pivotal movement of said arm and said bimetallic member, a movable member having an abutting portion engageable with said arm, said movable member being operable to be moved upward thereby lifting said arm and pivoting said bimetallic member to lift said valve stem independently of said electric heater in the event of failure of current in said electric circuit, a switch having a pair of normally open contacts, one of said contacts being carried by a movable resilient arm and having an abutment extending therefrom, said first-named arm being cooperable with said abutment and being operable upon predetermined lifting movement by said movable member to close said switch contacts, a second circuit for said electric heater including said last-named switch and operable to energize said heater independently of said control switch, a pivoted latch member engageable with said movable member upon predetermined upward movement thereof to restrain the same from downward movement, said latch member having a projecting portion extending toward said valve operating stem, said second circuit being operable to energize said electric heater upon recurrence of current after a current failure and operation of said movable member, said electric means upon energization by said second circuit causing said bimetallic member to lift said valve operating stem further, and said collar being engageable with said projecting portion upon predetermined further lifting of said stem and operable to pivot said latch member out of engagement with said movable member to release the same for downward movement, said downward movement of said movable member being operable to permit said switch contacts to open.

14. In an automatic valve assembly, a valve operating stem, thermostatic means fulcrumed for pivotal movement and operable to move said stem upon thermal energization or upon pivotal movement, a movable supporting member, a second member carried by said supporting member and operable to have movement relative thereto, said second movable member being cooperable with said thermostatic means and operable to hold the same in a predetermined initial position relative to said supporting member, said second movable member being operable upon movement in one direction to pivot said thermostatic means relative to said supporting member to move said stem in a valve opening direction and upon movement in the opposite direction to permit said thermostatic means to pivot and said stem to move in a valve closing direction, said second movable member providing a manually operable means for moving said stem independently of the state of energization of said thermostatic means, means operable upon predetermined movement of said second movable member in said one direction to hold the same against movement in the opposite direction, said thermostatic means being operable upon energization subsequent to manual opening by said second movable member to move said stem further in a valve opening direction, said stem being cooperable with said holding means and operable upon predetermined further opening movement by said thermostatic means to release said second movable member for movement in the opposite direction, and condition responsive means cooperable with said supporting member and operable to move the same to permit said thermostatic means to pivot in a valve closing direction.

15. An automatically controlled gas valve comprising a valve member, a warpable thermostatic plate operable on bending movement to open said valve member, electrical means for heating said plate, means supporting said plate for bodily rotary movement, movable means supporting said plate in a predetermined initial position and operable upon movement to rotate said plate to open said valve, releasable means to hold said last-named means in plate rotated position, a lever carrying said plate rotating means and said releasable means, said plate rotating means being movable relative to said lever, condition responsive means to rotate said lever to move said valve member toward closed position, and means operable upon opening movement of said valve member by warping movement of said plate member to release said releasable means to permit movement of said plate rotating means relative to said lever for valve closing movement.

EARNEST J. DILLMAN.
FRED C. GALLEY.

REFERENCES CITED

The following references are of record in the file of this patent:

UNITED STATES PATENTS

| Number | Name | Date |
|---|---|---|
| 1,814,812 | Klees | July 14, 1931 |
| 1,844,071 | Newell | Feb. 9, 1932 |
| 2,118,886 | Joesting | May 31, 1938 |
| 2,187,045 | McCorkle | Jan. 16, 1940 |
| 2,286,630 | Landon | June 16, 1942 |
| 2,291,504 | Persons | July 28, 1942 |
| 2,349,209 | Taylor | May 16, 1944 |
| 2,398,086 | Dillman | Apr. 9, 1946 |
| 2,409,112 | Dillman | Oct. 8, 1946 |